United States Patent Office 3,333,959
Patented Aug. 1, 1967

3,333,959
HIGH EDGE-GRADIENT PHOTOSENSITIVE MATERIALS
Yoshihide Hayakawa, Minamiashigara-machi, Ashigarakami-gun, Kanagawa-ken, Japan, assignor to Fuji Shashin Film Kabushiki Kaisha, Ashigarakami-gun, Kanagawa-ken, Japan, a corporation of Japan
No Drawing. Filed May 15, 1964, Ser. No. 367,893
Claims priority, application Japan, May 21, 1963, 38/25,418
4 Claims. (Cl. 96—76)

This invention relates to a light-sensitive silver-halide material and more particularly to a material providing a photographic image having high edge-gradient.

The density gradient of a darkened portion of photographic image at the boundary is called "edge-gradient." In general, the higher the edge-gradient, the sharper is the image. In order to obtain a photographic image having high edge-gradient by using a silver halide photographic emulsion, a special developing solution of a high pH value, and containing hydroquinone as the developing agent and a small amount of sulfite has been employed. (For example, ref. Yule, J.A.C., "Formaldehyde-Hydroquinone Developers and Infections Development," J. Frank, Inst., 239, 221 (1945).)

It is an object of this invention to provide photographic emulsions which can give the highly contrasted image when the developing solution of this type is used. Photosensitive materials prepared from such emulsions are suitable for producing halftone-dot by means of glass screen or contact screen.

It has been well known that by the addition of derivatives of alkylene oxide, such as the addition polymer of 1 mole of sorbitan monolaurate and 20 moles of ethylene oxide, to the emulsion results in the increase in the contrast of image (ref. U.S.P. No. 2,400,532). However, since the addition of alkylene oxid also results in the remarkable decrease in the rate of development, it is necessary to prolong the time of development in order to attain the sufficient contrast. Therefore, when the development is carried out for a relatively short time, as is common in practice (for 2 to 3 minutes), the decrease in sensitivity is remarkable and the halftone-dots having sharp edge cannot be obtained. Accordingly, it is the object of this invention to produce the superior halftone dots with a relatively short time of development by increasing the contrast and the edge-gradient of the image.

The object of this invention is accomplished by incorporating in the emulsion layer and/or its adjacent layer of a photographic material both (A) a compound selected from the group consisting of those represented by the following general Formula I and their salts (e.g. hydrohalide, sulfate, etc.) and (B) a compound selected from derivatives of 4-hydroxy-1,3,3a,7-tetrazaindene represented by the following general Formula II.

$$\begin{array}{c} R_1 \\ \diagdown \\ N-A-X-CONHR_3 \\ \diagup \\ R_2 \end{array} \quad (I)$$

wherein $R_1$ and $R_2$ each represents alkyl group, or may combine to form a ring, which may contain —O—, —S—, or —NR— group (R represents alkyl or acyl group). $R_3$ represents alkyl or aryl group, and A represents an alkylene group. X represents —NH— or —O— group.

(tetrazaindene structure with positions 1, 2, 3, 3a, 4, 5, 6, 7 and substituents $R'_1$, $R'_2$, OH)

wherein $R'$ and $R'_1$ each represents hydrogen atom, alkyl group, aralkyl group or aryl group. $R'_2$ represents hydrogen atom, alkyl group, carboxy group or alkoxycarbonyl group.

Examples of the compounds represented by the general Formula I are as follows:

*Compound 1*

$$\begin{array}{c} CH_3 \\ \diagdown \\ NCH_2CH_2CH_2NHCONH-\!\!\!\bigcirc\!\!\!-CH_3 \\ \diagup \\ CH_3 \end{array}$$

*Compound 2*

$$\begin{array}{c} C_2H_5 \\ \diagdown \\ NCH_2CH_2CH_2CHNHCONH-\!\!\!\bigcirc \\ \diagup \quad\quad\quad\quad | \\ C_2H_5 \quad\quad\quad\quad CH_3 \end{array}$$

*Compound 3*

$$\begin{array}{c} CH_2-CH_2 \\ CH_2 \diagdown \quad\quad\diagdown \\ \quad\quad NCH_2CH_2CH_2NHCONH-\!\!\!\bigcirc\!\!\!-Cl \\ \diagup \\ CH_2-CH_2 \end{array}$$

*Compound 4*

$$\begin{array}{c} CH_2-CH_2 \\ O \diagdown \quad\diagdown \\ \quad\quad NCH_2CH_2NHCONHC_2H_5 \\ \diagup \\ CH_2-CH_2 \end{array}$$

*Compound 5*

$$\begin{array}{c} CH_2\!-\!\!-CH_2 \\ | \quad\quad\quad \diagdown \\ \quad\quad N-CH_2-CH_2O\cdot CONH-\!\!\!\bigcirc\!\!\!\cdot HCl \\ CH_2\!-\!\!-CH_2 \\ \quad | \\ \quad CH_3 \end{array}$$

*Compound 6*

$$\begin{array}{c} CH_2-CH_2 \\ CH_2 \diagdown \quad\diagdown \\ \quad\quad N-CH_2CH_2CH_2OCONH-\!\!\!\bigcirc\!\!\bigcirc\!\!\cdot HCl \\ \diagup \\ CH_2-CH_2 \end{array}$$

*Compound 7*

$$\begin{array}{c} C_4H_9 \\ \diagdown \\ NCH_2CH_2OCONH-\!\!\!\bigcirc\!\!\!\cdot\tfrac{1}{2}H_2SO_4 \\ \diagup \\ C_4H_9 \end{array}$$

*Compound 8*

$$\begin{array}{c} CH_2CH_2 \\ CH_3CON \diagdown \quad\diagdown \\ \quad\quad NCH_2CH_2OCNH-\!\!\!\bigcirc\!\!\!-OCH_3 \\ \diagup \quad\quad\quad\quad || \\ CH_2CH_2 \quad\quad O \end{array}$$

It will be seen that these compounds are characterized in that they carry more than two nitrogen atoms, one of which is in a form of tertiary amine and the other forms urea- or urethane-type combination.

The above-mentioned tetrazaindene compounds can generally be synthesized by heating one mole of β-ketoesters or α-ethoxymethylene-β-ketoesters with one mole of 3-amino-1,2,4-triazoles. Examples of these compounds are as follows:

*Compound 9*

(tetrazaindene structure with HO, CH, CH, OH substituents)

*Compound 10*

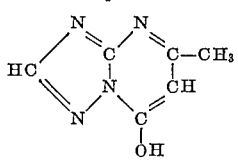

*Compound 11*

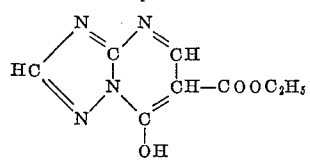

*Compound 12*

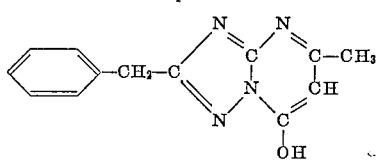

In this invention, derivatives of polyalkylene oxide, which are useful for the same purpose as that of this invention, can be employed together with the tetrazaindenes of this invention.

Any type of derivatives of polyalkylene oxide can be employed for this purpose. That is, the condensation products of alkylene oxide with water, aliphatic alcohols, glycols, fatty acids, phenols, aliphatic amines or hexitol ring dehydration products can be employed.

It is preferable for polyalkylene oxide derivatives used in this invention to have a molecular weight between 800 and 6,000. Examples of these compounds are given as follows:

$HOCH_2CH_2O(CH_2CH_2O)_nCH_2CH_2OH$ (n equal ca. 50)

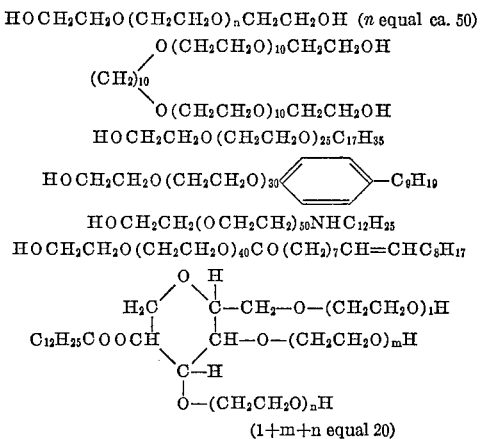

$HOCH_2CH_2O(CH_2CH_2O)_{25}C_{17}H_{35}$ $HOCH_2CH_2O(CH_2CH_2O)_{30}$—⟨ ⟩—$C_9H_{19}$ $HOCH_2CH_2(OCH_2CH_2)_{50}NHC_{12}H_{25}$ $HOCH_2CH_2O(CH_2CH_2O)_{40}CO(CH_2)_7CH=CHC_8H_{17}$ (1+m+n equal 20)

The most useful amount of compounds in this invention may be varied according to the sort of emulsion, however, it is preferable to add the compounds in a proportion of 0.05 to 10 grams of the compounds of the general Formula I and 0.01 to 2 grams of tetrazaindenes per mole of silver halide in the emulsion.

Photographic emulsions are prepared in the following three stages: (1) The emulsification and digestion (first ripening) of the silver halide. (2) Removal of excess of salts by washing with water and the like. (3) Second digestion (after ripening) to increase the sensitivity. The compounds of this invention may be added to the emulsion in any stage of emulsion making, but it is most preferable to add them after the second digestion and before coating. The compounds are dissolved in solvents that have no detrimental effect on the emulsion, for example water, lower alcohols such as methanol or ethanol and ketones such as acetone, and added to the emulsion. It is not necessary to add these compounds directly to the emulsion, but they may be added to the adjacent layer of the emulsion layer, such as protective coating, and allowed to diffuse into the emulsion layer.

The photographic emulsion that can be employed in this invention is that of silver chloride, silver bromide, silver chlorobromide, silver iodobromide or silver chloroiodobromide. The emulsion of silver chlorobromide is most preferable.

The emulsion may be sensitized chemically by the well known methods, for example, by the addition of unstable compounds containing sulfur such as ammonium thiosulfate, or allylthiourea (ref. P. Glafkidès, Chimie Photographique, 2ème Edition Photocinéma, 1957, p. 297, Paul Montel Paris), and/or compounds of gold such as a complex of monovalent gold and thiocyanic acid (ref. ibid., p. 301). The emulsion also may be optically sensitized by the addition of sensitizing dyes such as cyanine dyes, or merocyanine dyes (for example, ref. Shinichi Kikuchi et al., "Handbook of Scientific Photograph," 1959, pp. 15–24, Maruzen, Tokyo). The emulsion also may be stabilized by the addition of heterocyclic compounds such as benzotriazole or 1-phenyl-5-mercapto tetrazole. The emulsion also may be hardened by the addition of hardening agents such as formaldehyde or mucochloric acid, and the emulsion may contain surface active agents such as saponin in order to facilitate the coating.

EXAMPLE

Seven samples were prepared by adding the tetrazaindene compound and the compounds represented by the general Formula I to an orthochromatic emulsion of silver chlorobromide which contains the optimum amounts sensitizing dyes and hardening agent, 30 mol percent of silver bromide, and gelatin in a proportion of 105 grams of gelatin to 1 mol of silver halide. The amounts of compounds are shown in the following table.

| Sample: | Compounds and their amounts (grams per mol of silver halide) |
|---|---|
| a | None (Control). |
| b | Compound 3, 0.48. |
| c | Compound 10, 0.96. |
| d | Compound 3, 0.48 and Compound 10, 0.96. |
| e | Compound 6, 0.24. |
| f | Compound 11, 1.2. |
| g | Compound 6, 0.24 and Compound 11, 1.2. |

These emulsions were coated on film bases, and then sensitometry and evaluation of halftone-dot were carried out.

In sensitometry a tungsten light (2666° K.) was employed as a light source and an optical step wedge was used to vary the exposure. Development was carried out at 20° C., using the developing solution having the following composition:

| | |
|---|---|
| Water _____cc__ | 500 |
| Sodium sulfite (desiccated) _____g__ | 30 |
| Paraformaldehyde _____g__ | 7.5 |
| Sodium bisulfite _____g__ | 2.2 |
| Boric acid _____g__ | 7.5 |
| Hydroquinone _____g__ | 22.5 |
| Potassium bromide _____g__ | 1.6 |
| Water to make 1 liter. | |

Evaluation of halftone-dot was carried in the following way. During exposure, a commercial magenta contact screen (150 lines) was placed in close contact to the sample film, which was exposed and developed in the same way as in the case of sensitometry. The halftone-dot formed was observed by a microscope in comparison with standard samples. The dot was evaluated and classified according to the sharpness of dot edge into five classes A, B, C, D and E, of which A is the sharpest.

Results of 1′30, 2′15″ or 3′ development at 20° C. are summarized in the following table.

| Sample | Relative sensitivity | | | Contrast [1] | | | Quality of dot | | |
|---|---|---|---|---|---|---|---|---|---|
| | 1′30″ | 2′15″ | 3′ | 1′30″ | 2′15″ | 3′ | 1′30″ | 2′15″ | 3′ |
| a | 27 | 58 | 100 | 4.0 | 7.7 | 7.4 | D | B | C |
| b | 72 | 87 | 105 | 7.7 | 7.0 | 6.3 | B | C | D |
| c | 10 | 23 | 50 | 2.1 | 3.3 | 5.9 | E | D | C |
| d | 35 | 60 | 93 | 6.5 | 8.8 | 8.3 | B | A | B |
| e | 73 | 87 | 110 | 7.5 | 7.5 | 6.7 | B | C | D |
| f | 8 | 20 | 47 | 1.8 | 2.9 | 6.2 | E | E | C |
| g | 32 | 55 | 95 | 6.2 | 9.0 | 7.8 | B | A | B |

[1] Average slope between a point of base density plus fog density plus 0.1 and a point of base density plus fog density plus 2.1 in the characteristic curve.

As seen from the table, d and g give sharper dots and higher contrast in a wide range of time of development.

What is claimed is:

1. A photosensitive material comprising a support, a silver halide emulsion layer, and subsidiary layers adjacent the emulsion layer, at least one of said layers containing (A) a compound selected from the group consisting of the compounds represented by general Formula I

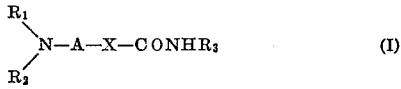

wherein $R_1$ and $R_2$ each is an alkyl group, $R_3$ is a member selected from the class consisting of an alkyl group and an aryl group, A is an alkylene group, and X is a member selected from the class consisting of —NH— and —O—; and the hydrohalides and sulfates thereof, and (B) a tetrazaindene compound represented by general Formula II

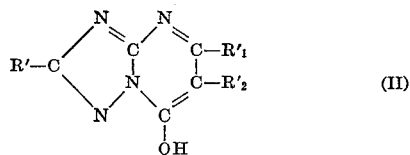

wherein R′ and R′$_1$ each is a member selected from the class consisting of hydrogen atom, an alkyl group, an aralkyl group and an aryl group, and R′$_2$ is a member selected from the class consisting of hydrogen atom, an alkyl group, a carboxy group and an alkoxycarbonyl group.

2. The photosensitive material as claimed in claim 1 wherein the amount of said compound (A) is about 0.05 g. to 10 g. per 1 mol of the silver halide in the emulsion.

3. The photosensitive material as claimed in claim 1 wherein $R_1$ and $R_2$ in the compound represented by general Formula I form a ring.

4. The photographic material as claimed in claim 3 wherein said ring contains a member selected from the class consisting of —O—, —S— and >NR$_4$ (where R$_4$ is a member selected from the class consisting of an alkyl group and an acyl group).

References Cited

UNITED STATES PATENTS 3,190,752  6/1965  Hayakawa et al. _____ 96—107

NORMAN G. TORCHIN, *Primary Examiner.*

J. H. RAUBITSCHEK, *Assistant Examiner.*